United States Patent
Ishikawa et al.

(10) Patent No.: US 7,735,396 B2
(45) Date of Patent: Jun. 15, 2010

(54) WAVE GEAR DRIVE HAVING NEGATIVE DEFLECTION MESHING TOOTH PROFILE

(75) Inventors: Shoichi Ishikawa, Yokohama (JP); Noboru Takizawa, Minamiazumi-gun (JP)

(73) Assignee: Harmonic Drive Systems Inc., Tokyo (JP)

( * ) Notice: Subject to any disclaimer, the term of this patent is extended or adjusted under 35 U.S.C. 154(b) by 824 days.

(21) Appl. No.: 11/579,767

(22) PCT Filed: Jun. 21, 2004

(86) PCT No.: PCT/JP2004/008714

§ 371 (c)(1), (2), (4) Date: Nov. 8, 2006

(87) PCT Pub. No.: WO2005/124189

PCT Pub. Date: Dec. 29, 2005

(65) Prior Publication Data
US 2007/0266819 A1 Nov. 22, 2007

(51) Int. Cl.
F16H 33/00 (2006.01)

(52) U.S. Cl. .......................................... 74/640; 74/462

(58) Field of Classification Search ................... 74/640, 74/462
See application file for complete search history.

(56) References Cited

U.S. PATENT DOCUMENTS 2,906,143 A  9/1959  Musser (Continued)

FOREIGN PATENT DOCUMENTS

JP  45-41171  12/1970

(Continued)

OTHER PUBLICATIONS

International Search Report dated Aug. 24, 2004.

*Primary Examiner*—David D Le
*Assistant Examiner*—Derek D Knight
(74) *Attorney, Agent, or Firm*—Buchanan Ingersoll & Rooney PC (57) ABSTRACT

A rigid internal gear and a flexible external gear of a wave gear drive are spur gears of module m. The number of teeth of the external gear is smaller by 2n (n is a positive integer) than that of the internal gear. The deflection of the major axis of the elliptical rim neutral line on the principal cross-section of the external gear is set at $2\kappa mn$ ($\kappa<1$). On the principal cross-section, the meshing of both gears is approximated by rack meshing. The locus M of movement of a tooth of the external gear caused by the rotation of a wave generator is determined. A part AC of the locus M of movement from the inflection point A of the locus M of movement to the deepest position B of meshing is determined on the entering side of meshing of the teeth toward the major axis of the locus M of movement. A first similar curve FG generated by multiplying the curve part AC by $\kappa$ is employed as the tooth profile of the external gear, and a second similar curve DE generated by multiplying the curve part AC by ($\kappa+1$) is employed as the tooth profile of the internal gear. The tooth whole depth is increased wherever possible so that the range of the tooth profile of the internal gear may be the greatest at which the tooth tip touches the locus M of movement of the tip of tooth of the external gear, thus realizing a wave gear drive of high ratcheting torque.

12 Claims, 7 Drawing Sheets

U.S. PATENT DOCUMENTS

| | | | |
|---|---|---|---|
| 4,823,638 A | 4/1989 | Ishikawa | |
| 5,687,620 A | 11/1997 | Ishikawa | |
| 5,782,143 A | 7/1998 | Ishikawa | |
| 5,918,508 A | 7/1999 | Ishikawa | |
| 6,167,783 B1 * | 1/2001 | Ishikawa | 74/640 |
| 6,526,849 B1 | 3/2003 | Ishikawa | |

FOREIGN PATENT DOCUMENTS

| | | | |
|---|---|---|---|
| JP | 62-075153 A | 4/1987 |
| JP | 63-115943 A | 5/1988 |
| JP | 64-079448 A | 3/1989 |
| JP | 7-167228 A | 7/1995 |
| JP | 7-293643 A | 11/1995 |
| JP | 9-166186 A | 6/1997 |
| JP | 2001-146945 A | 5/2001 |
| WO | 96/19683 A1 | 6/1996 |

* cited by examiner

WAVE GEAR DRIVE HAVING NEGATIVE DEFLECTION MESHING TOOTH PROFILE

TECHNICAL FIELD

The present invention relates to a wave gear drive, particularly a wave gear drive having a tooth profile that can prevent ratcheting during high reduction.

BACKGROUND ART

Since the wave gear drive was invented by C. W. Musser (Patent Reference 1) to the present day, various types of wave gear drives have been invented by many researchers, including Musser and the inventor of the present application. Various inventions have also been proposed relating just to tooth profiles of wave gear drives. For example, the inventor of the present application has proposed making the basic tooth profile an involute tooth profile (Patent Reference 2), and a method of designing a tooth profile in which the tooth addendum profiles for wide contact between the rigid internal gear and the flexible external gear are derived using a rack approximation of the meshing between the two gears (Patent References 3 and 4). There has also been proposed an invention for avoiding interference between rack-approximated tooth profiles (Patent Reference 5).

Patent Reference 1: U.S. Pat. No. 2,906,143
Patent Reference 2: JP 45-41171 B
Patent Reference 3: JP 63-115943 A
Patent Reference 4: JP 64-79448 A
Patent Reference 5: JP 7-167228 A

DISCLOSURE OF THE INVENTION

Problem the Invention is Attempting to Solve

In the case of a wave gear drive that has a low reduction ratio in which the two gears thereof have a low number of teeth, to prevent the increase in bending stresses that accompany the elliptical deformation of the flexible external gear, the amount of radial flexing thereof has to be small. That is, the maximum amount of flexing when the circular profile of the flexible external gear is deformed into an elliptical shape has to be set to be a flexing amount $\kappa mn$ ($\kappa<1$) that is smaller than the normal flexing amount $mn$ that is standard. Such a measure is required, for example, in a case of a low reduction ratio of 60 in which the number of teeth of the two gears does not exceed 124. Here, n is a positive integer, and the difference between the number of teeth of the two gears is 2n. m is module. Also, $\kappa$ is a coefficient called a flexing coefficient; a case in which the amount of flexing in a radial direction, at $\kappa mn$ ($\kappa<1$), is less than the flexing amount $mn$ with $\kappa=1$ is called negative deflection.

However, the tooth depth of the two gears is related to the flexing amount, and when the amount of radial deflection is set at a negative deflection flexing amount that is smaller than the normal flexing amount (=$mn$), the tooth depth is smaller, and during high load torque there is a risk of the occurrence of the phenomenon of tooth-skipping, called ratcheting. To prevent ratcheting, the tooth depth of the two gears has to be made as large as possible.

In a wave gear drive equipped with a negative deflection tooth profile in which the amount of elliptical deflection is less than the normal flexing amount, the problem for the present invention is to make the tooth depth of the two gears thereof as large as possible in order to prevent ratcheting.

Means for Solving the Problems

The present invention solves the above problems in a wave gear drive having a circular rigid internal gear, a flexible external gear disposed therein, and a wave generator inserted therein, the flexible external gear is equipped with a flexible cylindrical body and an annular diaphragm that extends in a radial direction from a back end of the cylindrical body, a tooth portion formed on a front end opening portion side of the cylindrical body that is flexed into an elliptical shape by a flexing amount generated by the wave generator from a back end portion on the diaphragm side to the front end portion on the opening side thereof that is approximately proportional to distance from the diaphragm, characterized in that:

the basic rigid internal gear and flexible external gear are spur gears with a module m, a number of teeth of the flexible external gear is smaller by 2n (n is a positive integer) than a number of teeth of the rigid internal gear, a flexing amount of a major axis of an elliptical rim neutral line of the flexible external gear at a cross-section of the flexible external gear perpendicular to the axis at an arbitrarily selected location in the direction of the tooth trace thereof (hereinafter referred to as main cross-section) is set to be $2\kappa mn$ ($\kappa<1$), meshing of the teeth of the rigid internal gear and flexible external gear in the main cross-section is approximated by rack meshing and a movement locus of a tooth of the flexible external gear with respect to a tooth of the rigid internal gear that accompanies rotation of the wave generator is obtained, on an entering side of meshing of the teeth towards the major axis of the movement locus, a portion extending from a position of an inflection point of the movement locus to a deepest meshing position of the two gears is a curved portion employed as a tooth profile, the curved portion is enlarged by $\lambda$ to obtain a first similar curve that is employed as the tooth profile of the flexible external gear, the curved portion is enlarged by ($\lambda+1$) to obtain a second similar curve that is employed as the tooth profile of the rigid internal gear, and the tooth profile of the rigid internal gear has a range whereby the tooth addendum thereof touches the movement locus of the tooth addendum of the flexible external gear.

Here, it is desirable that the range of the tooth profile of the rigid internal gear may be the greatest where the tooth addendum thereof touches the maximum point of the movement locus of the tooth addendum of the flexible external gear.

In a wave gear drive that flexes the flexible external gear into an elliptical shape by a negative deflection flexing amount ($\kappa<1$), movement loci of the meshing of the teeth of the rigid internal gear and flexible external gear in the main cross-section are approximated by rack meshing, and continuous contact between the two gears is effected by using similar curves obtained by analogous enlargement of a curved portion on the meshing entry side of the position of deepest meshing that is the apex of the rack movement loci as the basic tooth profiles of the two gears.

Also, with this invention, the ratcheting torque is raised by making $\lambda$ as large as possible to increase the tooth depth of both gears. That is, the $\lambda$ maximum value is a position on the movement locus of the teeth of the flexible external gear to which the tooth addendum of the rigid internal gear comes; making $\lambda$ any larger causes interference between the addenda of the two gears. In this invention, ratcheting torque is increased by making the tooth depth as large as possible without causing interference between the two gears.

Here, in order to ensure that effective meshing of the two gears can be maintained at a region other than the main cross-section of the flexible external gear when said main cross-section is at the back end portion on the diaphragm side of the flexible external gear, on the axial cross-section including the major axis of the flexible external gear flexed into an elliptical shape, it is desirable to subject the teeth of the flexible external gear to relieving from the position of the main cross-section to the front end portion on the opening side, so that the tooth addenda of the flexible external gear follow the tooth bottoms of the teeth of the rigid internal gear.

For example, the flexible external gear may be made as a constant-height-teeth conical gear in which the cylindrical surface of the addenda of the flexible external gear forms a conical surface, with the outside diameter of the cone gradually decreasing, going from the back end portion on the diaphragm side to the front end portion on the opening side, in the tooth trace direction, so that the tooth addenda of the flexible external gear are parallel to the tooth bottoms of the teeth of the rigid internal gear on the axial cross-section that includes the major axis after deformation of the flexible external gear.

When the main cross-section is a cross-section perpendicular to an axis passing through the center of the balls of a wave bearing of the wave generator in the flexible external gear, it is desirable to subject the teeth of the flexible external gear to relieving in the tooth trace direction, from the position of the main cross-section to the front end portion on the opening side and the back end portion on the diaphragm side.

The wave gear drive having a negative deflection tooth profile with a large tooth depth, according to the present invention, is suitable for use in low reduction ratio cases in which the number of teeth of the two gears is not larger than 124.

Effect of the Invention

As explained in the foregoing, in a wave gear drive in which the flexible external gear is flexed into an elliptical shape by a negative deflection flexing amount ($\kappa<1$), the present invention makes it possible to maximize the tooth depth of the two gears. In addition, movement loci of the meshing of the teeth of the two gears are approximated by rack meshing, and continuous contact between the two gears can be effected by using similar curves obtained by analogous enlargement of a curved portion on the meshing entry side of the position of deepest meshing that is the apex of the rack movement loci as the basic tooth profiles of the two gears.

Therefore, in accordance with the wave gear drive having a negative deflection tooth profile of this invention, even though the flexing amount of the flexible external gear is smaller compared to the usual standard ($\kappa=1$), the tooth depth can be made larger, making it possible to realize high ratcheting torque meshing. It is also possible to achieve continuous meshing over the range of the movement loci used to define the tooth profile, rather than the momentary kind of meshing provided by a linear type tooth profile. Therefore, the present invention makes it possible to raise the load capabilities of low reduction ratio wave gear drives that use a small number of teeth.

BEST MODE FOR CARRYING OUT THE INVENTION

A wave gear drive that applies the present invention is described below, with reference to the drawings.

(Configuration of the Wave Gear Drive)

Figure 1:
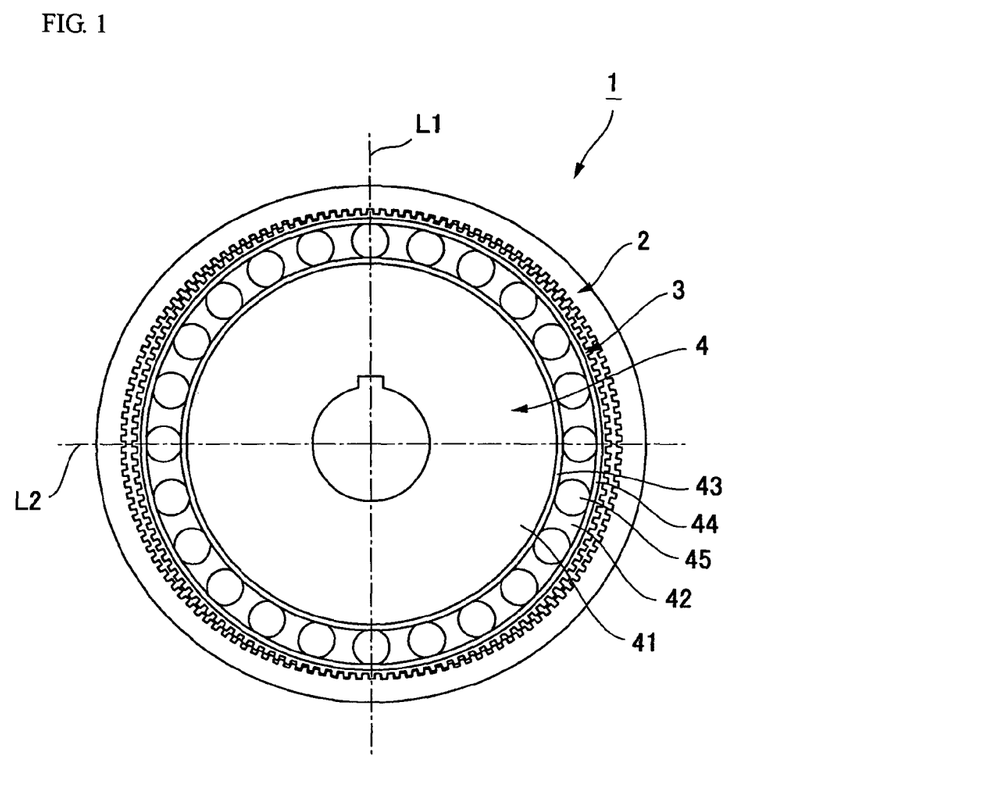
FIG. 1 is a general front view of a wave gear drive that is an object of the present invention.
Figure 2:
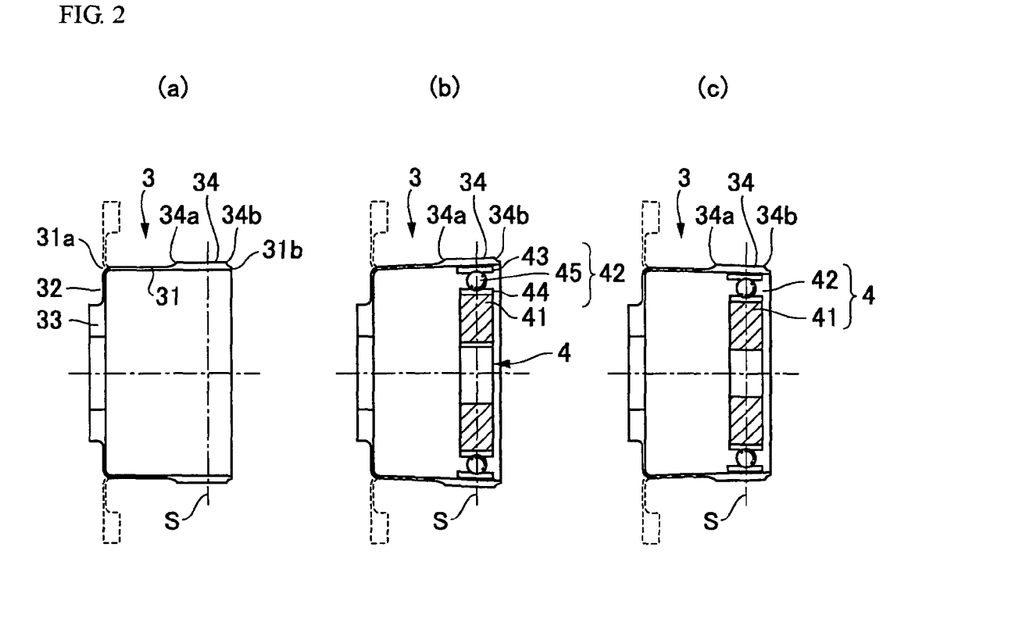
FIG. 2 is an explanatory diagram showing an axial cross-section that includes the flexing condition of the flexible external gear, with (a) showing the state before deformation, (b) a cross-section that includes the major axis after deformation to an ellipse, and (c) a cross-section that includes the minor axis.

FIG. 1 is a front view of the wave gear drive that is the object of the present invention, FIG. 2 is a cross-sectional diagram showing an axial cross-section that includes the opening portion of the flexible external gear thereof in the condition of being flexed into an elliptical shape, with (a) showing the state before deformation, (b) a cross-section that includes the major axis of the ellipse after deformation, and (c) a cross-section that includes the minor axis of the ellipse after deformation. In addition, in FIG. 2 a solid line shows a cup-shaped flexible external gear, and a broken line shows a silk-hat-shaped flexible external gear.

As shown in these drawings, wave gear drive 1 has a circular, rigid internal gear 2, a flexible external gear 3 disposed therein, and a wave generator 4 inserted therein. The difference between the number of teeth of the rigid internal gear 2 and the flexible external gear 3 is 2n (n is a positive integer). The flexible external gear 3 of the wave gear drive 1 is flexed into an ellipse by a wave generator 4 having an elliptical profile, engaging with the rigid internal gear 2 at the two end portions in the direction of the major axis L1 of the ellipse. The wave generator 4 is equipped with a rigid cam plate 41 affixed to a rotating shaft that is not shown, and a wave bearing 42 mounted on the outside peripheral surface thereof. The wave bearing 42 is equipped with flexible inner and outer rings 43, 44, and a plurality of balls 45 inserted therebetween that can freely roll. When the wave generator 4 rotates, the position of meshing of the two gears 2, 3 moves circumferentially, generating relative rotation between the two gears 2, 3 that corresponds to the difference in the number of teeth of the two gears.

As shown in FIG. 2 (a), the flexible external gear 3 is equipped with a flexible cylindrical body 31, a diaphragm 32 expanding radially that is continuous with a back end 31a thereof, a boss 33 that is continuous with the diaphragm 32, and external teeth 34 formed on an outer peripheral surface portion of an opening end 31b side of the cylindrical body 31. By means of the wave generator 4 having an elliptical profile inserted in the inside peripheral surface portion of the external teeth formation portion of the cylindrical body portion 31, the amount by which the cylindrical body portion 31 is flexed radially inwards or outwards from the back end 31a of the diaphragm side thereof towards the opening end opening end 31b is gradually increased.

That is, as shown in FIG. 2 (b), the outward flexing amount at a cross-section that includes the major axis L1 of the ellipse, gradually increases proportional to the distance from the back end 31a to the opening end 31b, and as shown in FIG. 2 (c), the inward flexing amount at a cross-section that includes the minor axis L2 of the ellipse gradually increases in proportion to the distance from the back end 31a to the opening end 31b. Therefore, the flexing amount of the external teeth 34 formed on the outer peripheral surface portion on the opening end 31b side also gradually increases from the back end portion 34a to the front end portion 34b in the tooth trace direction thereof, in proportion to the distance from the cylindrical body back end 31a.

(Method of Forming Tooth Profile in Main Cross-Section)

Figure 3:
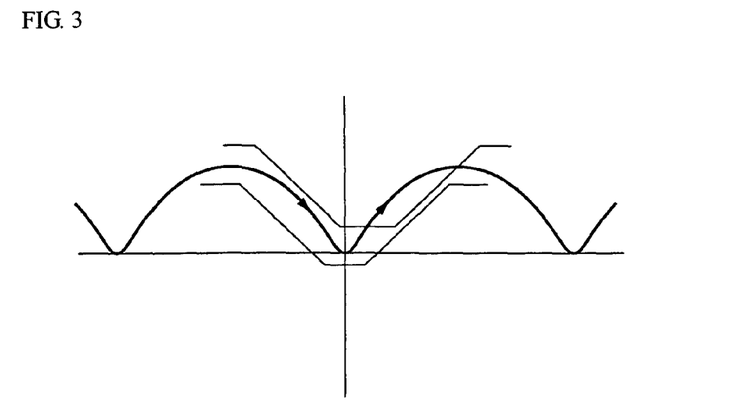
FIG. 3 is the movement locus of a rack in a case in which the basis of the tooth profile formation of the present invention is $\kappa<1$.

FIG. 3 is a diagram showing the movement locus of the teeth of the flexible external gear 3 with respect to the rigid internal gear 2, obtained in a case in which the relative movement of the two gears 2, 3 of the wave gear drive 1 is rack-approximated. The movement locus M is that which is obtained in the main cross-section constituting the basis of the formation of the tooth profiles of the two gears 2, 3 (cross-section perpendicular to the axis at a prescribed selected location in the direction of the tooth trace of the external teeth 34 of the flexible external gear 3). The movement locus M of the teeth of the gear 3 is given by the following equation.

$$x = 0.5\ mn(\theta - \kappa \sin \theta)$$

$$y = \kappa mn(1 - \cos \theta)$$

Here, $\kappa$ is a flexing coefficient that is smaller than "1", m is module. In addition, the total amplitude of the movement locus M of the flexible external gear 3 is $2\kappa mn$.

Figure 4:
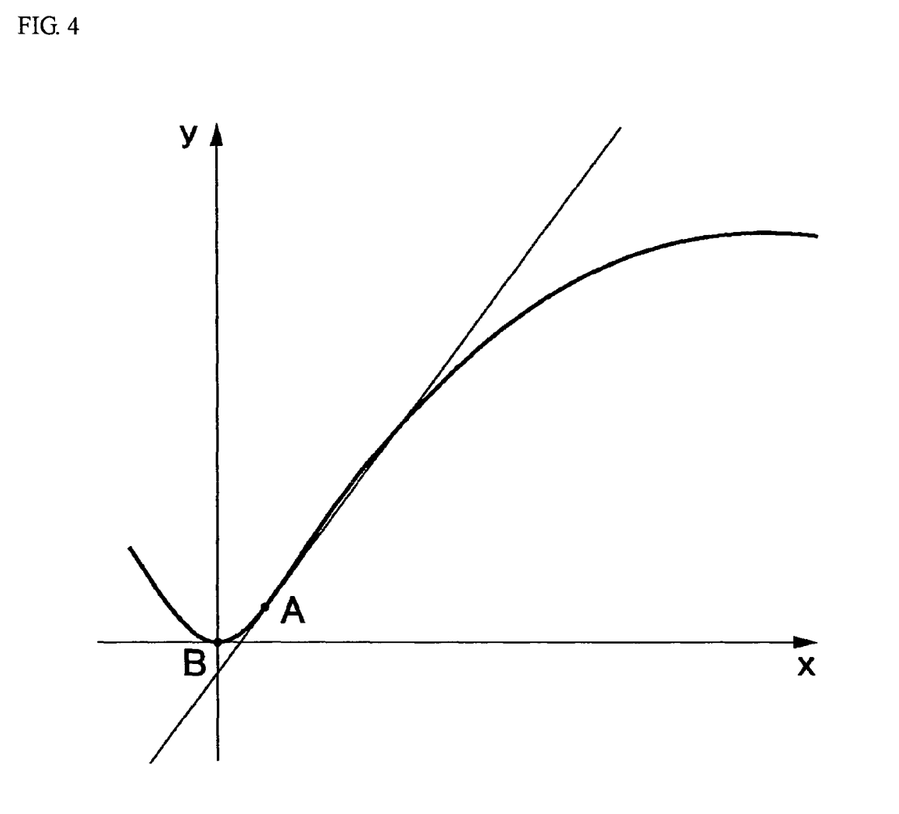
FIG. 4 is an explanatory diagram showing, of the movement locus of FIG. 3, the utilization range for tooth profile formation.

FIG. 4 is an explanatory diagram showing the utilization range of the tooth movement locus M. The movement locus portion AB that is utilized is that which, on the meshing entering side of the deepest meshing position point B, extends from point A, which is an inflection point of the movement locus M, to the deepest position point B at which the angle of inclination (pressure angle) of a tangent of the movement locus M formed with respect to the y axis (radial line of the rigid internal gear) is 90 degrees. Negative deflection meshing is started by teeth of the flexible external gear 3 entering the tooth space of the rigid internal gear 2 and contacting the teeth of the rigid internal gear 2 from point A (inflection point of the movement locus M) on the side before the deepest position B is reached. The movement locus portion AB is utilized to obtain the tooth profiles of the two gears 2, 3, as described below.

Figure 5:
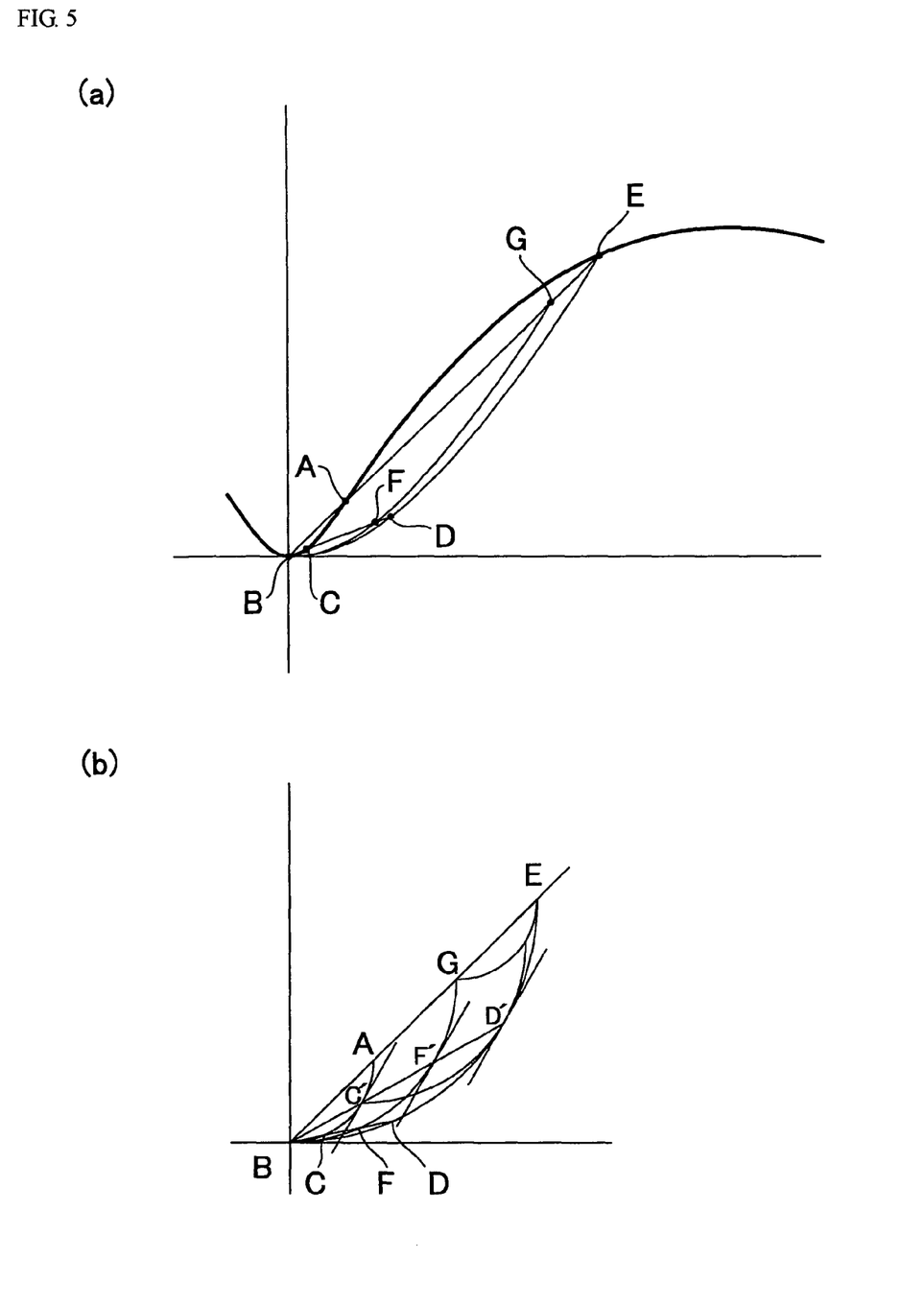
FIG. 5 is an explanatory diagram showing examples of the tooth profiles set for the two gears.

First, as shown in FIG. 5 (a), a part AC of the working range of the movement locus portion AB is used. The curve portion AC is multiplied by $\lambda$ to obtain a first similar curve FG that is employed as the tooth profile of the flexible external gear 3. The curved portion AC is also multiplied by $(\lambda+1)$ to obtain a second similar curve DE that is employed as the tooth profile of the rigid internal gear 2. As shown by the principle illustrated in FIG. 5 (b) with respect to the two tooth profiles thus set, from the nature of similarity, when the movement locus is moved to point C', point F' on the tooth profile FG and the tangent at that point overlay point D' on tooth profile DE and the tangent at that point, enabling continuous meshing to take place between the movement loci AC.

Here, it is necessary to make the tooth depth as large as possible in order to increase the ratcheting torque. To do this, $\lambda$ is made as large as possible. The maximum value thereof is the position to which an addendum of the rigid internal gear 2 comes on the movement locus M. Making it larger gives rise to interference between the addenda of the two gears. FIG. 5 (a) shows this case. The extreme value of the maximum value of $\lambda$ is a case in which the addendum of the rigid internal gear is selected as the location of the maximum amplitude (maximum value) of the movement locus M.

Figure 6:
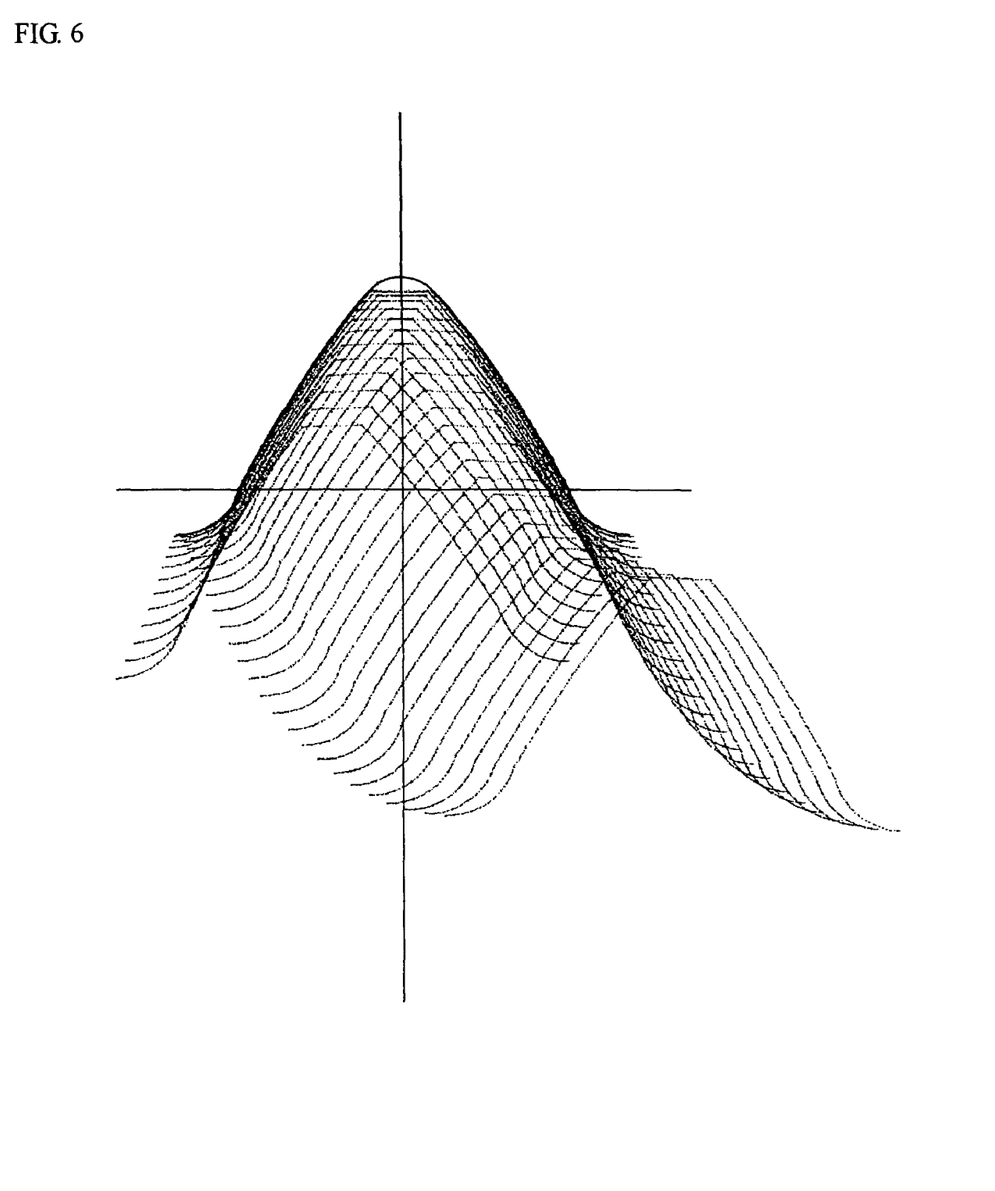
FIG. 6 is an explanatory diagram showing the movement of one tooth of the flexible external gear with respect to one tooth of the rigid internal gear, in the main cross-section.

FIG. 6 shows the movement of one tooth of the flexible external gear 3 with respect to one tooth of the rigid internal gear 2, in the main cross-section. This drawing is not a case of rack meshing but of a finite number of teeth that is 102 teeth of the rigid internal gear 2 and 100 teeth of the flexible external gear 3. It shows that the tooth profile setting of the present invention based on rack approximation is also effective in the case of a finite number of teeth.

(Tooth Profile at a Cross-Sectional Position Perpendicular to the Axis other than the Main Cross-Section)

The foregoing explanation relates to a method of forming a tooth profile at the main cross-section of the flexible external gear 3. A tooth profile may be formed as follows to maintain effective meshing in a cross-section perpendicular to the axis other than the main cross-section.

First, in the flexible external gear 3, it is desirable to use the back end portion 34a on the diaphragm side for the main cross-section and apply relieving towards the front end portion 34b to enable meshing to be maintained in each cross-section of the tooth trace towards the front end portion 34b on the opening side.

Figure 7:
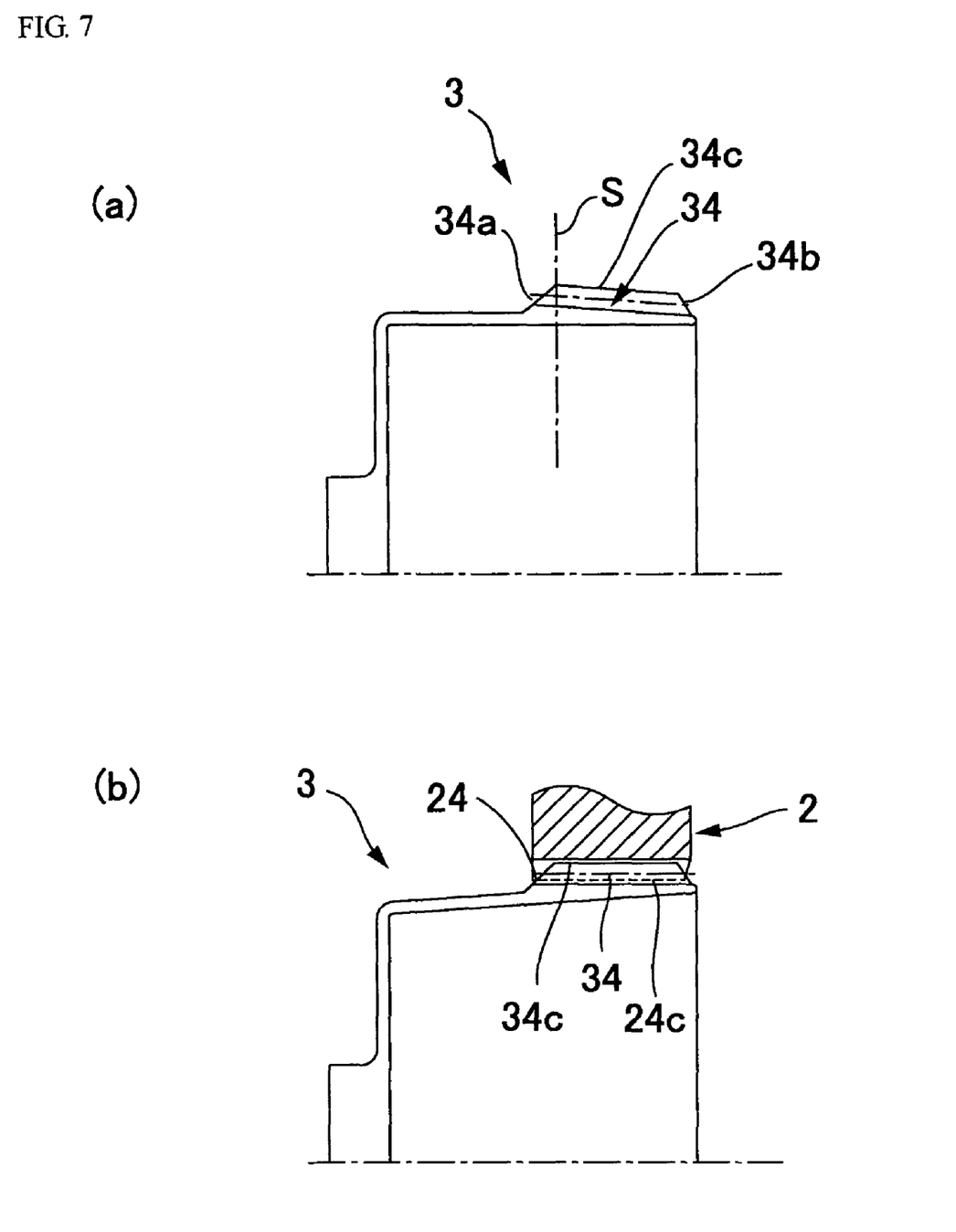
FIG. 7 are cross-sectional diagrams showing the cross-section prior to deformation and the state of meshing after deformation, in a case in which the flexible external gear is a conical gear.

As shown in FIG. 7 (a), for example, to enable meshing to be maintained in each cross-section in the tooth trace direction from the front end portion 34b on the opening side to the back end portion 34a, the flexible external gear 3 is formed as a constant-height-teeth conical gear with the minor diameter towards the front end portion 34b. Also, the shape of the tip cylinder surface 34c thereof is formed as a conical surface with the major diameter facing towards the back end portion 34a of the flexible external gear 3, and in the cross-section perpendicular to the axis that includes the major axis of the wave generator 4, the generator of the addendum cone of the flexible external gear 3 is set to follow (be parallel to) the tooth bottoms 24c of the teeth 24 of the rigid internal gear 2 as a spur gear. FIG. 7 (b) shows the state of meshing with the rigid internal gear 2 at a cross-section that includes the major axis of the flexible external gear 3 flexed into an elliptical shape by the wave generator 4.

Figure 8:
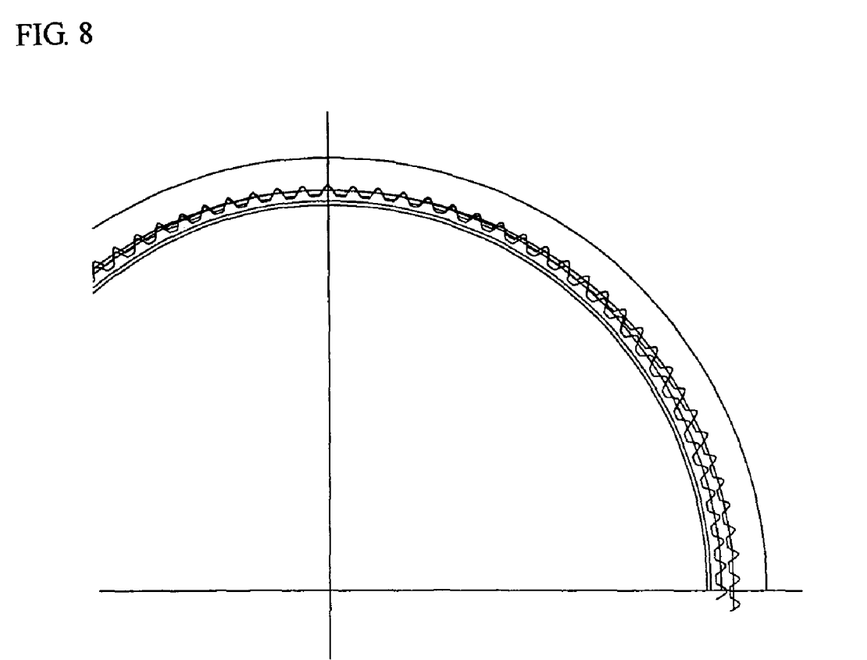
FIG. 8 is an explanatory diagram showing meshing in the main cross-section of the two gears.
Figure 9:
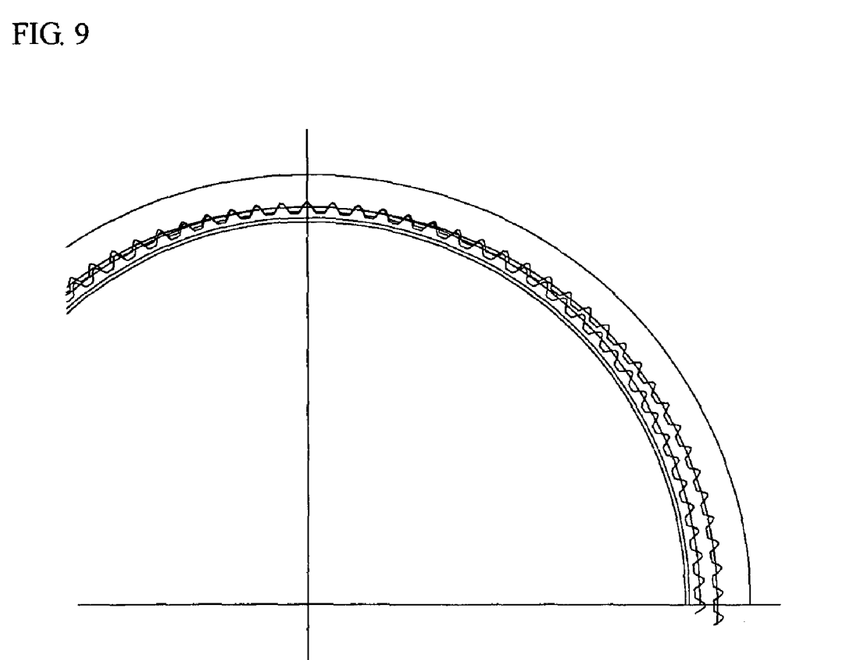
FIG. 9 is an explanatory diagram showing the state of meshing of the two gears in a cross section perpendicular to the axis of the front end portion of the tooth trace (the end on the opening side).

FIG. 8 is an explanatory diagram showing the state of meshing of the back end portion 34a in the tooth trace direction that is the main cross-section S in a case in which the flexible external gear 3 is thus formed as a conical gear, in a case in which the tooth depth is made the maximum. FIG. 9 is an explanatory diagram showing the state of meshing of the front end portion 34b of the tooth trace (the end on the opening side). From this, it can be seen that, while it is an approximation, there is meshing of the tooth profiles at cross-sections other than the main cross-section.

Figure 10:
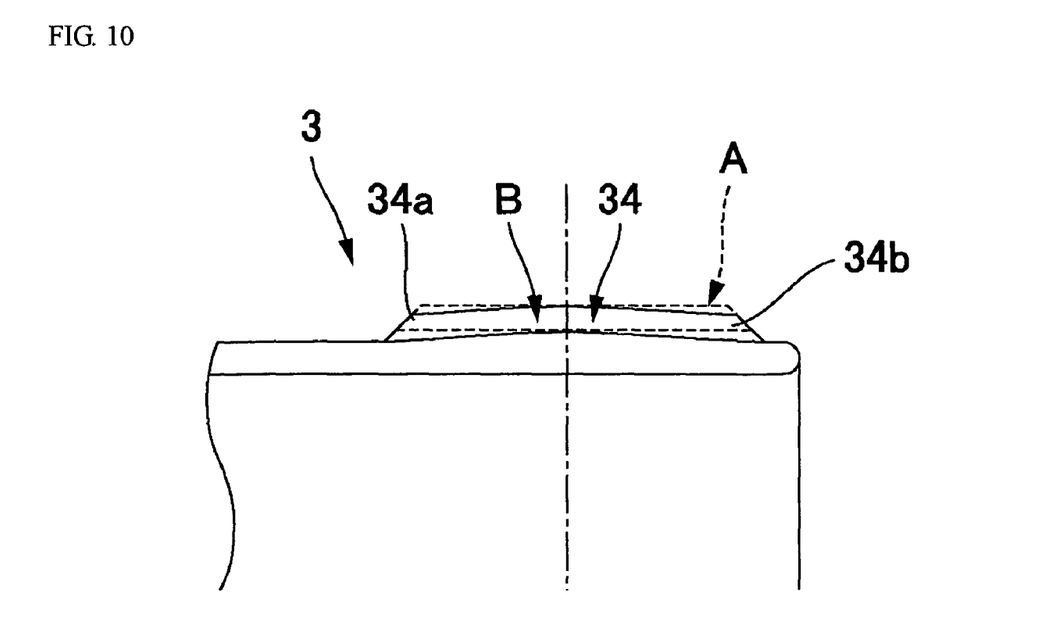
FIG. 10 is an explanatory diagram showing relieving applied to the teeth of the flexible external gear in a case in which the main cross-section passes through the center of the balls of the wave bearing of the wave generator.

Next, in a case in which a cross-section perpendicular to an axis that passes through the center of the wave bearing 42 of the wave generator 4 is taken as the main cross-section S (position S in FIG. 2), meshing interference can be avoided with applying relieving from that position to the back end portion 34a (diaphragm side) and front end portion 34b (opening side) in the tooth trace direction. FIG. 10 shows an example of the relieving in this case. In this drawing, broken line A is the tooth trace in a case in which it extends over the entire tooth trace in the main cross-section S, and the solid line B shows the tooth trace obtained by applying relieving to this tooth trace.

EXPLANATION OF SYMBOLS

1 Wave gear drive
2 Internal gear
24 Teeth
3 External gear
31a Back end
31b Opening end
34 External teeth
34a Back end portion in direction of tooth trace
34b Front end portion in direction of tooth trace
4 Wave generator
41 Rigid cam plate
42 Wave bearing
45 Ball
M Movement locus
AB Movement locus portion used to set tooth profile
FG First similar curve
DE Second similar curve
B Deepest position of movement locus
A Position of inflection point on the movement locus
S Main cross-section

The invention claimed is:

1. A wave gear drive having a circular rigid internal gear, a flexible external gear disposed therein, and a wave generator inserted therein, the flexible external gear is equipped with a flexible cylindrical body and an annular diaphragm that extends in a radial direction from a back end of the cylindrical body, a tooth portion formed on a front end opening portion side of the cylindrical body that is flexed into an elliptical shape by a flexing amount generated by the wave generator from a back end portion on the diaphragm side to a front end portion on the opening end side thereof that is approximately proportional to distance from the diaphragm,
wherein:
a basic rigid internal gear and flexible external gear are spur gears with a module m,
a number of teeth of the flexible external gear is smaller by 2n, wherein n is a positive integer, than a number of teeth of the rigid internal gear,
a flexing amount of a major axis of an elliptical rim neutral line of the flexible external gear at a cross-section of the flexible external gear perpendicular to the axis at an arbitrarily selected location in the direction of a tooth trace thereof (hereinafter referred to as main cross-section) is set to be $2\kappa mn$, wherein $\kappa < 1$,
meshing of the teeth of the rigid internal gear and flexible external gear in the main cross-section is approximated by rack meshing and a movement locus M of a tooth of the flexible external gear with respect to a tooth of the rigid internal gear that accompanies rotation of the wave generator is obtained,
on an entering side of meshing of the teeth towards a major axis of the movement locus M, a curved portion AB extending from a position of an inflection point of the movement locus M to a deepest meshing position B of the two gears is selected,
the curved portion AB is enlarged by similarity transformation using a first ratio of similitude $\lambda$ to obtain a first similar curve GF that is employed as a tooth profile of the flexible external gear,
the curved portion AB is enlarged by similarity transformation using a second ratio of similitude $\lambda+1$ to obtain a second similar curve that is employed as a tooth profile of the rigid internal gear, and
the tooth profile of the rigid internal gear has a range whereby a tooth addendum thereof touches the movement locus M of a tooth addendum of the flexible external gear.

2. The wave gear drive of claim 1,
wherein the range of the tooth profile of the rigid internal gear is greatest where the tooth addendum thereof touches a maximum point of the movement locus M of the tooth addendum of the flexible external gear.

3. The wave gear drive of claim 1,
wherein said main cross-section is at the back end portion on the diaphragm side of the flexible external gear, and
on an axial cross-section including the major axis of the flexible external gear flexed into an elliptical shape, the teeth of the flexible external gear are subjected to relieving from the position of the main cross-section to the front end portion on the opening side so that tooth addenda of the flexible external gear are parallel to tooth bottoms of the teeth of the rigid internal gear.

4. The wave gear drive of claim 3,
wherein the flexible external gear is formed as a constant-height-teeth conical gear, and
on an axial cross-section including the major axis of the flexible external gear after deformation, the shape of the tip cylinder surface thereof is formed as a conical surface with an outside diameter that gradually decreases from the back end portion on the diaphragm side towards the front end portion on the opening side, so that tooth addenda of the flexible external gear are parallel to tooth bottoms of teeth of the rigid internal gear.

5. The wave gear drive of claim 1,
wherein the main cross-section is a cross-section perpendicular to an axis passing through a center of balls of a wave bearing of the wave generator in the flexible external gear, and
the teeth of the flexible external gear are subjected to relieving in the tooth trace direction from the position of the main cross-section to the front end portion on the opening side and the back end portion on the diaphragm side.

6. The wave gear drive of claim 1, wherein the number of teeth of the rigid internal gear and flexible external gear is not larger than 124.

7. The wave gear drive of claim 2, wherein said main cross-section is at the back end portion on the diaphragm side of the flexible external gear, and on an axial cross-section including the major axis of the flexible external gear flexed into an elliptical shape, the teeth of the flexible external gear are subjected to relieving from the position of the main cross-section to the front end portion on the opening side so that tooth addenda of the flexible external gear are parallel to tooth bottoms of the teeth of the rigid internal gear.

8. The wave gear drive of claim 2, wherein the main cross-section is a cross-section perpendicular to an axis passing through a center of balls of a wave bearing of the wave generator in the flexible external gear, and the teeth of the flexible external gear are subjected to relieving in the tooth trace direction from the position of the main cross-section to the front end portion on the opening side and the back end portion on the diaphragm side.

9. The wave gear drive of claim 2, wherein the number of teeth of the rigid internal gear and flexible external gear is not larger than 124.

10. The wave gear drive of claim 3, wherein the number of teeth of the rigid internal gear and flexible external gear is not larger than 124.

11. The wave gear drive of claim 4, wherein the number of teeth of the rigid internal gear and flexible external gear is not larger than 124.

12. The wave gear drive of claim 5, wherein the number of teeth of the rigid internal gear and flexible external gear is not larger than 124.

* * * * *